United States Patent [19]
Cheng

[11] Patent Number: 5,895,188
[45] Date of Patent: Apr. 20, 1999

[54] FORM PANEL QUICK FASTENER

[76] Inventor: Tsan-Hsiung Cheng, No. 1051, Lung Tien, Lung Pen Tsun, Kuan Tien Hsiang, Tainan County, Taiwan

[21] Appl. No.: 08/922,350

[22] Filed: Sep. 3, 1997

[51] Int. Cl.⁶ .................... F16B 37/08; E04G 11/06
[52] U.S. Cl. .................... 411/433; 411/437; 411/348; 52/426; 249/40
[58] Field of Search .................... 411/433, 432, 411/437, 531, 348; 52/426; 249/40, 190

[56] References Cited

U.S. PATENT DOCUMENTS

| | | |
|---|---|---|
| 2,161,379 | 6/1939 | Neptune . |
| 2,523,131 | 9/1950 | Martin . |
| 2,583,962 | 1/1952 | Neptune . |
| 4,737,059 | 4/1988 | Batten .................... 411/433 |
| 4,841,796 | 6/1989 | Teramachi .................... 411/432 |
| 4,864,884 | 9/1989 | Klinkenberg .................... 411/432 |
| 4,908,916 | 3/1990 | Berle .................... 411/348 |
| 5,160,180 | 11/1992 | Mlynarczyk .................... 411/433 |
| 5,332,189 | 7/1994 | Tseng . |

FOREIGN PATENT DOCUMENTS 1536344  8/1968  France .................... 411/433

*Primary Examiner*—Flemming Saether
*Attorney, Agent, or Firm*—Varndell Legal Group

[57] ABSTRACT

A form panel quick fastener including a clamping plate having an elongated channel base fixedly fastened to a form panel at an outer side and a through hole disposed in the middle of the elongated channel base and aligned with a through hole of the form panel and a barrel raised from the elongated channel base at an inner side around the through hole of the clamping plate; a screw rod inserted through the through hole of the clamping plate and the through hole of the form panel and having a spiral groove around the periphery; and a ball thrust bearing sleeved onto the screw rod and forced into engagement with the barrel of the clamping plate to hold down the screw rod, the ball thrust bearing including a hexagonal head having a center through hole which receives the screw rod, a tubular flange perpendicularly raised from the hexagon head at one side around said center through hole of the hexagon head, a plurality of spiral holes spaced around the tubular flange at different elevations, and a plurality of steel balls respectively moved in the spiral holes and forced by an inside wall of the barrel of the clamping plate into engagement with the spiral groove of the screw rod.

4 Claims, 10 Drawing Sheets

FORM PANEL QUICK FASTENER

BACKGROUND OF THE INVENTION

The present invention relates to a fastening device adapted for fastening form panels together, and more particularly to a form panel quick fastener which can be quickly installed, and then dismantled from the form panels after setting of concrete.

When constructing a concrete wall or the like, form panels shall be set up and fastened together by screw bolts and nuts so that concrete can be molded into the desired shape. After molded concrete is hardened, the nuts must be removed from the screw bolts so that the form panels can be detached. However, it is not easy to remove the nuts from the screw bolts because the nuts must be turned outwards from the screw bolts through several turns. Further, before removing the nuts from the screw bolts, covered concrete must be cleared from the threaded stems of the screw bolts.

SUMMARY OF THE INVENTION

The present invention has been accomplished to provide a form panel quick fastener which eliminates the aforesaid problems. According to one embodiment of the present invention, the form panel quick fastener comprises a clamping plate having an elongated channel base fixedly fastened to a form panel at an outer side and a through hole disposed in the middle of the elongated channel base and aligned with a through hole of the form panel and a barrel raised from the elongated channel base at an inner side around the through hole of the clamping plate; a screw rod inserted through the through hole of the clamping plate and the through hole of the form panel and having a spiral groove around the periphery; and a ball thrust bearing sleeved onto the screw rod and forced into engagement with the barrel of the clamping plate to hold down the screw rod, the ball thrust bearing including a hexagonal head having a center through hole which receives the screw rod, a tubular flange perpendicularly raised from the hexagon head at one side around said center through hole of the hexagon head, a plurality of spiral holes spaced around the tubular flange at different elevations, and a plurality of steel balls respectively moved in the spiral holes and forced by an inside wall of the barrel of the clamping plate into engagement with the spiral groove of the screw rod. When the steel balls of the ball thrust bearing are disengaged from the barrel of the clamping plate by turning the ball thrust bearing relative to the screw rod, the ball thrust bearing can be quickly and directly removed from the screw rod, permitting the screw rod to be directly removed from the form panel.

According to the aforesaid statement, the present invention achieves the following advantages:

1. Time saving: The ball thrust bearing can be rapidly axially sleeved onto the screw rod without moving along the thread of the screw rod, and then firmly fixed in place by a rotary motion through one to two turns after it has been pushed into the through hole of the clamping plate.

2. Labor saving: Mounting or dismounting the ball thrust bearing is achieved by means of the rotary motion of the steel balls in the spiral groove of the screw rod and the through hole of the clamping plate, and the coefficient of friction between the steel balls an the screw rod or clamping plate is much less than the friction of a conventional form panel fastener.

3. Dirt resisting: Even if the spiral groove of the screw rod is covered with rust or concrete, the ball thrust bearing can be freely moved outwards and disconnected from the screw rod, without being constrained by dirt adhered in the spiral groove of the screw rod, once it is moved away from the through hole of the clamping plate through a rotary motion.

4. Easy of manufacturing: The clamping plate is made by stamping, the screw rod and the ball thrust bearing can be made by an automatic machine, therefore the form panel quick fastener can be made through a mass production process to achieve high quality and low cost requirements.

5. Wide application range: The ball thrust bearing can be used in any mechanical apparatus or constructional fixing structure for releasably quick fixation.

DETAILED DESCRIPTION OF THE PREFERRED EMBODIMENT

Figure 1:
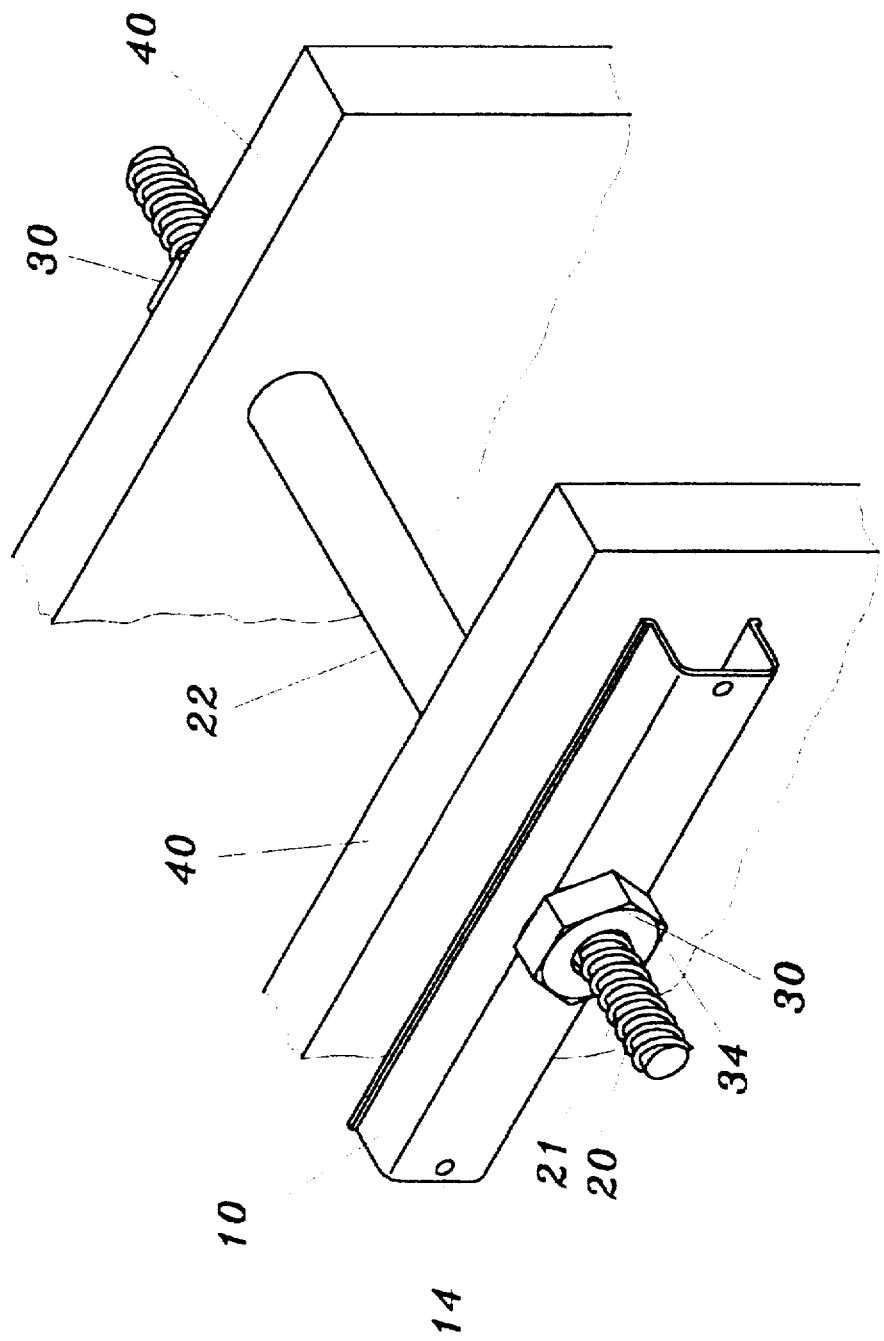
FIG. 1 is a perspective view of the present invention, showing the form panel quick fastener installed in two form panels.
Figure 2:
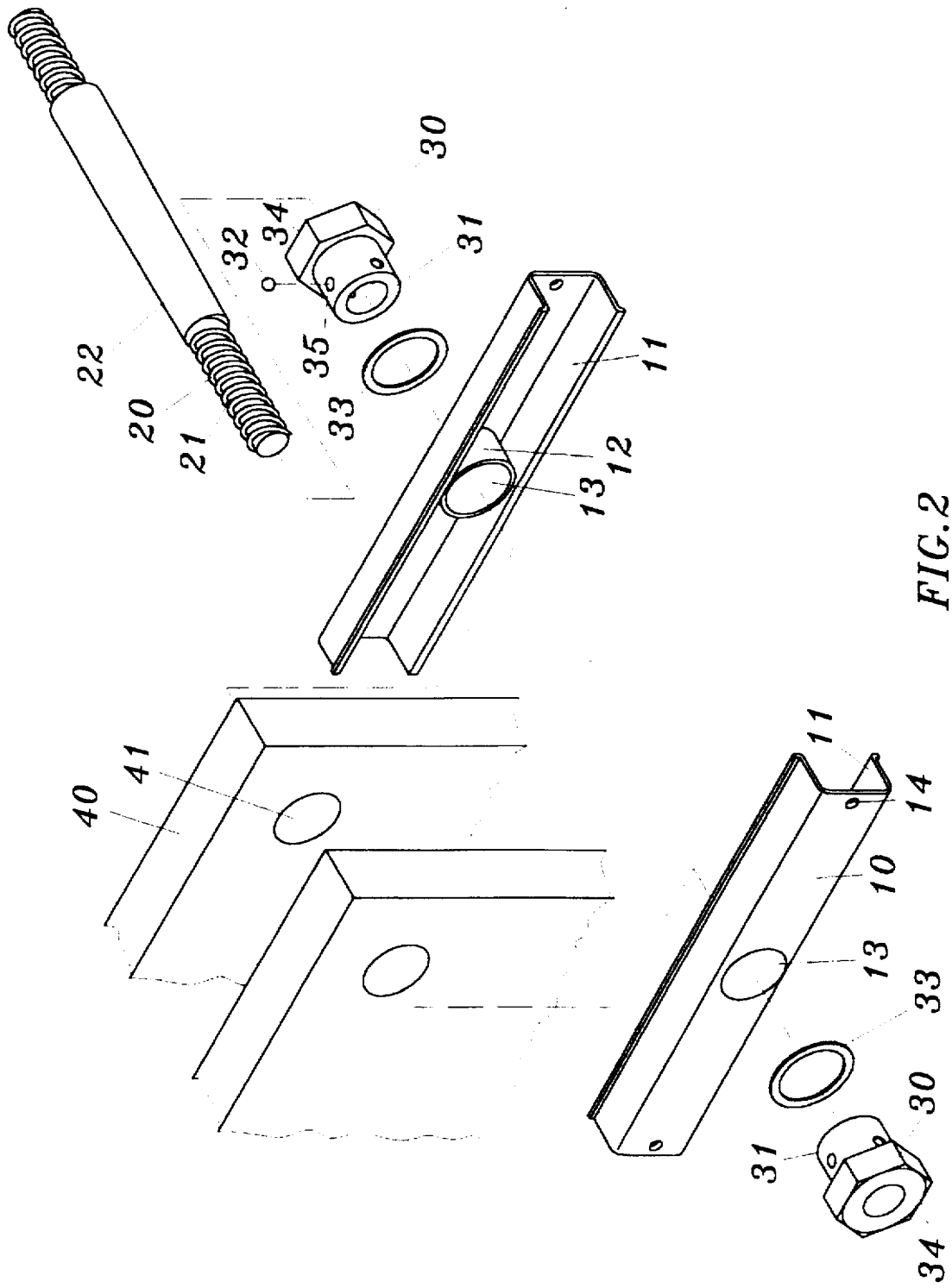
FIG. 2 is an exploded view of the assembly of FIG. 1.

Referring to FIGS. 1 and 2, a form panel quick fastener in accordance with the present invention is generally comprised of two clamping plates 10, a screw rod 20, and two ball thrust bearings 30. Each clamping plate 10 is comprised of an elongated channel base 11 having two mounting holes 14 at its both ends, and a barrel 12 integrally and perpendicularly raised from the elongated channel base 11 on the inside in the middle and defining a through hole 13, which passes through the middle of the elongated channel base 11. Through the mounting holes 14, the clamping plates 10 are respectively and fixedly fastened to two form panels 40 at an outer side, permitting the through holes 13 of the clamping plates 10 to be retained in alignment with through holes 41 of the form panels 40. The screw rod 20 has two spiral grooves 21 formed around the periphery at its both ends, and is inserted through the through holes 13 of the clamping plates 10 and the through holes 41 of the form panels 40. Further, a tapered sleeve 22 is fixedly mounted around the screw rod 20 in the middle between its two spiral grooves 21.

Figure 3:
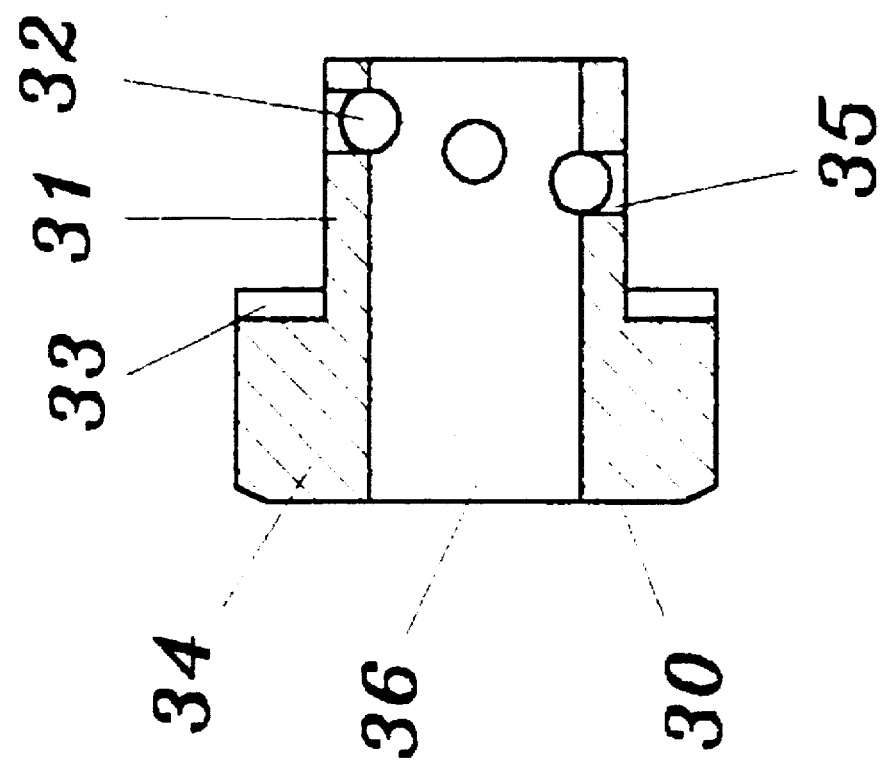
FIG. 3 is a longitudinal view in section of the ball thrust bearing according to the present invention.
Figure 4:
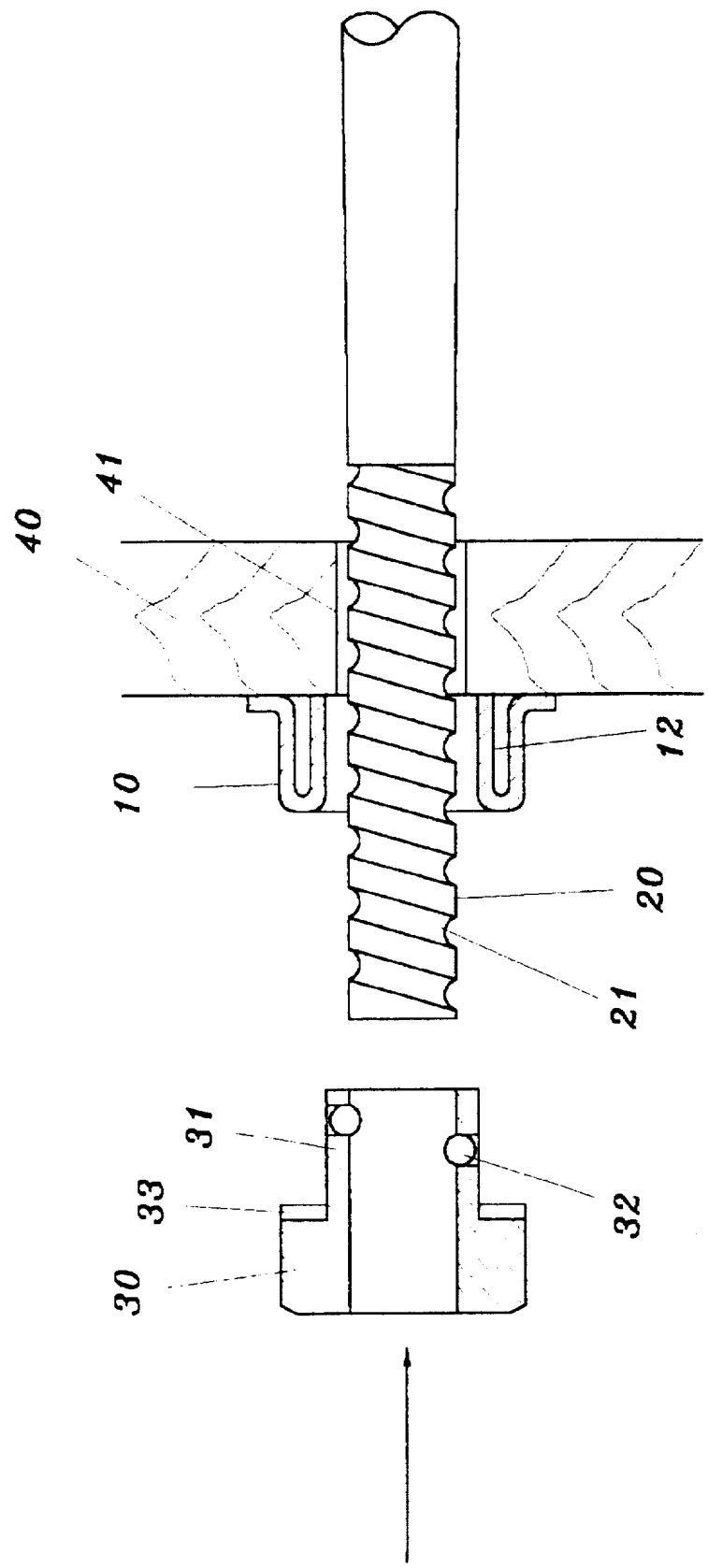
FIG. 4 is a sectional view of a part of the present invention before the installation of the ball thrust bearing.
Figure 5:
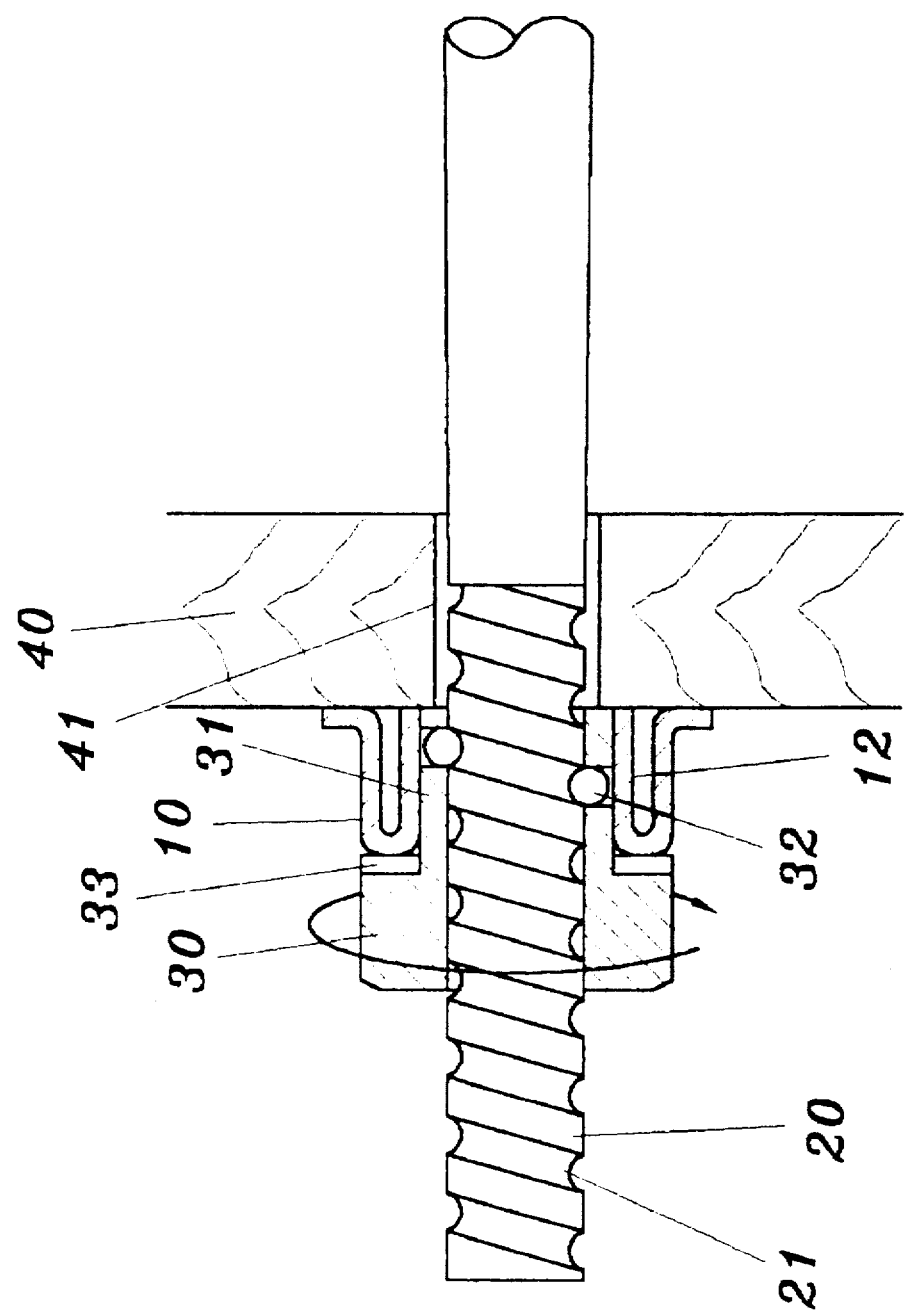
FIG. 5 is similar to FIG. 4 but showing the ball thrust bearing installed.

Referring to FIGS. 3, 4 and 5, and FIGS. 1 and 2 again, each ball thrust bearing 30 comprises a hexagonal head 34 having a center through hole 36, a tubular flange 31 perpendicularly raised from the hexagon head 34 at one side around the center through hole 36, a plurality of spiral holes 35 spaced around the tubular flange 31 at different elevations, and a plurality of steel balls 32 respectively moved in the spiral holes 35. When the screw rod 20 is inserted through the through holes 13 of the clamping plates 10 and the through holes 41 of the form panels 40, the ball thrust bearings 30 are respectively and axially sleeved onto the screw rod 20 from two opposite sides, permitting the respective tubular flanges 31 to be respectively forced into the through holes 13 of the clamping plates 10. When the tubular flanges 31 of the ball thrust bearings 30 are respectively forced to the through holes 13 of the clamping plates 10, the steel balls 32 are respectively forced inwards by the inside walls of the barrels 12 into engagement with the spiral grooves 21 of the screw rod 20. Therefore, when the hexagon heads 34 of the ball thrust bearings 30 are turned two times, the tubular flanges 31 of the ball thrust bearings 30 are completely forced into engagement with the inside walls of the barrels 12 of the clamping plates 10, and the steel balls 32 are firmly held in engagement with the spiral grooves 21 of the screw rod 20. Further, two washers 33 are respectively mounted around the tubular flanges 31 of the ball thrust bearings 30 and retained between the hexagon heads 34 of the ball thrust bearings 30 and the elongated channel bases 11 of the clamping plates 10.

Figure 6:
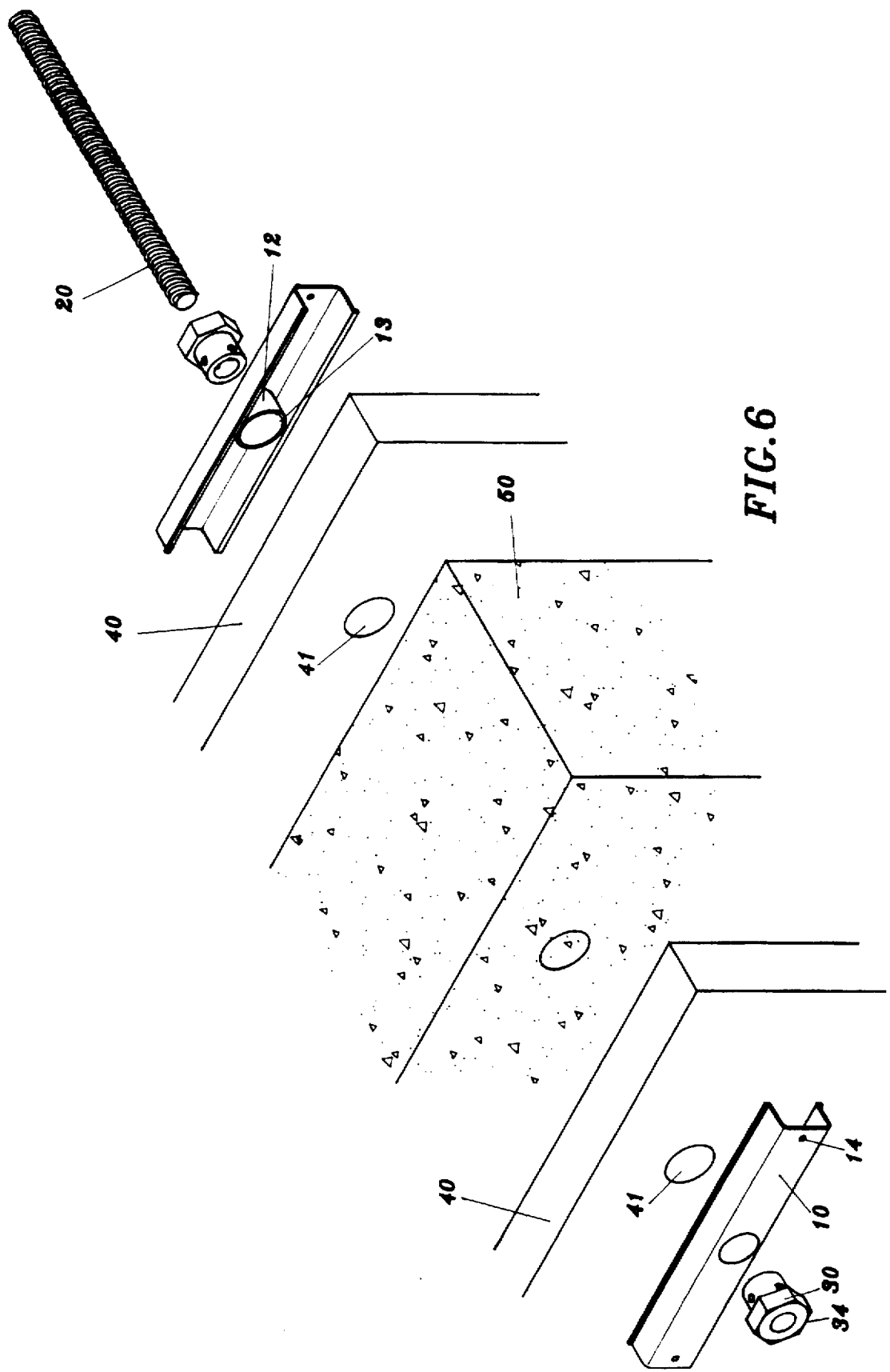
FIG. 6 shows the form panel quick fastener disconnected from the form panels and the parts thereof detached from one another.

Referring to FIG. 6, when to remove the form panels 40 after hardening of the concrete 50, the ball thrust bearings 30 are turned reversely to disconnect the tubular flanges 31 from the barrels 12 of the clamping plates 10. When the tubular flanges 31 of the ball thrust bearings 30 are respectively disengaged from the barrels 12 of the clamping plates 10, the ball thrust bearings 30 can then be directly and axially removed from the screw rod 20.

Figure 7:
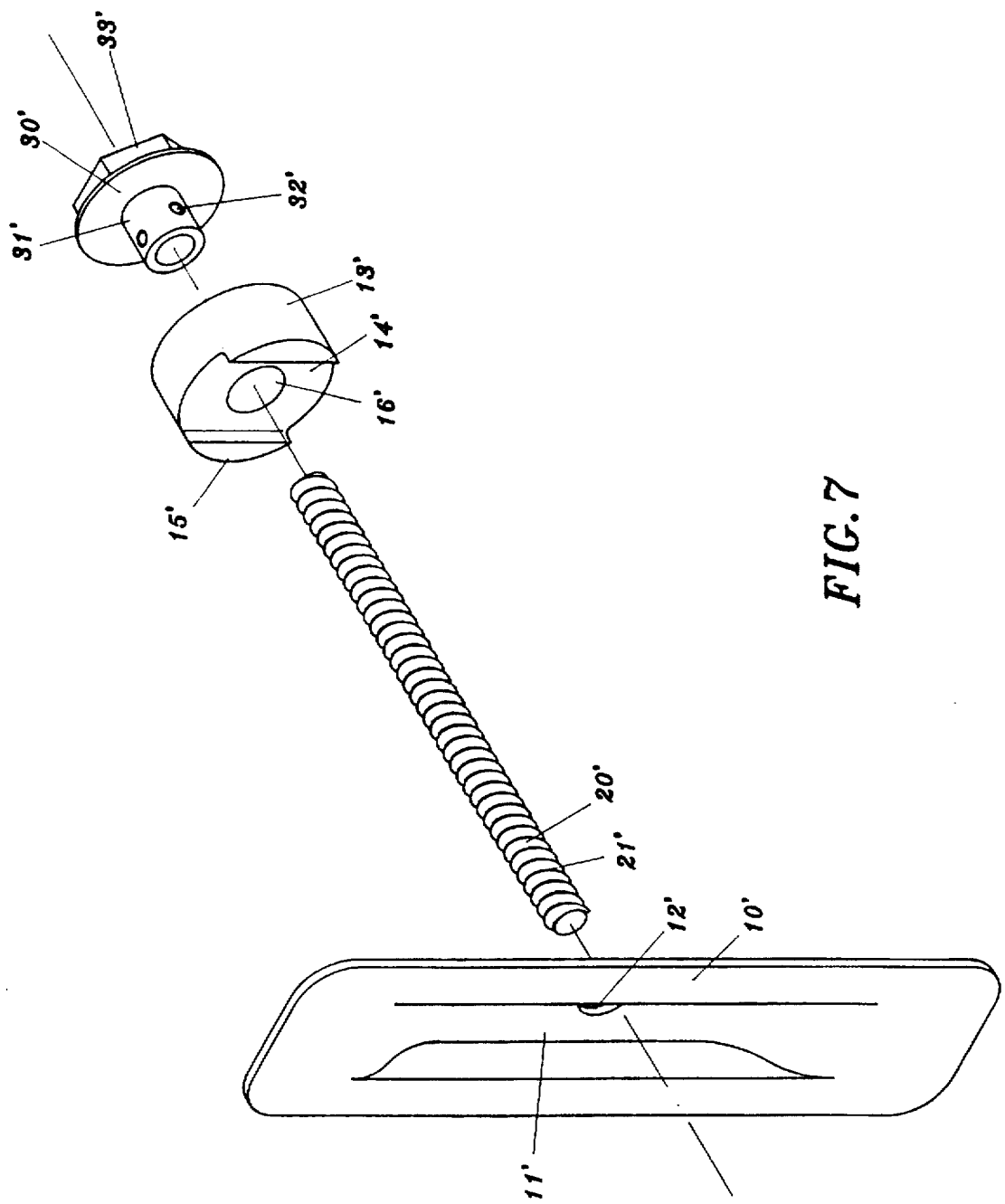
FIG. 7 is an exploded view of an alternate form of the present invention.
Figure 8:
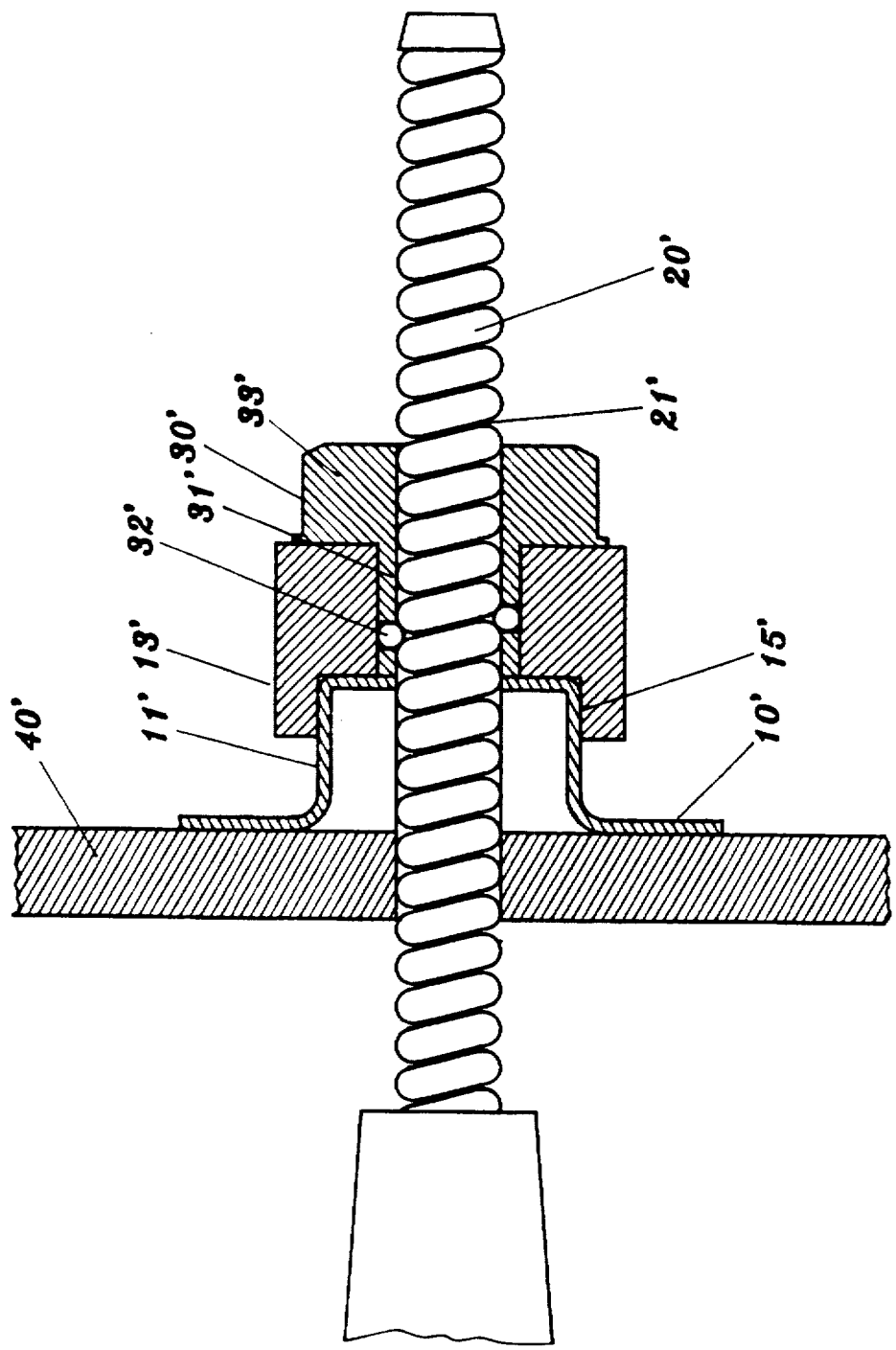
FIG. 8 is a sectional view of the alternate form of FIG. 7, showing the form panel quick fastener installed.

FIGS. 7 and 8 show an alternate form of the form panel quick fastener, in which the clamping plate, referenced by 10', is fixedly fastened to a form panel 40' at an outer side, having a convex portion 11' longitudinally disposed in the middle and a center through hole 12' at the center of the convex portion 11'; the screw rod, referenced by 20', is inserted through the center through hole 12' of the clamping plate 10', having a spiral groove 21' around the periphery; a locating socket, referenced by 13', is mounted around the screw rod 20', having a center through hole 16' which receives the screw rod 20', a cutout 14' at one said and at the locating socket 13' forms two locating flanges 15' perpendicularly and bilaterally raised therein which are respectively stopped at two opposite sides of the convex portion 11' of the clamping plate 10' in application; the ball thrust bearing, referenced by 30', comprises a tubular flange 31' perpendicularly raised from a hexagonal head 33' thereof at one side and inserted into the center through hole 16' of the locating socket 13', and a plurality of steel balls 32' mounted in respective spiral holes in the tubular flanges 31' and forced by the peripheral wall of the center through hole 16' of the locating socket 13' into engagement with the spiral groove 21' of the screw rod 20'. When the ball thrust bearing 30' is turned backwards, the steel balls 32' are moved along the spiral groove 21' of the screw rod 20' out of the center through hole 16' of the locating socket 13'. When the steel balls 32' are disengaged from the locating socket 13', the ball thrust bearing 30' and the locating socket 13' can then be directly axially removed away from the screw rod 20', permitting the screw rod 20' to be removed from the form panel 40'.

Figure 9:
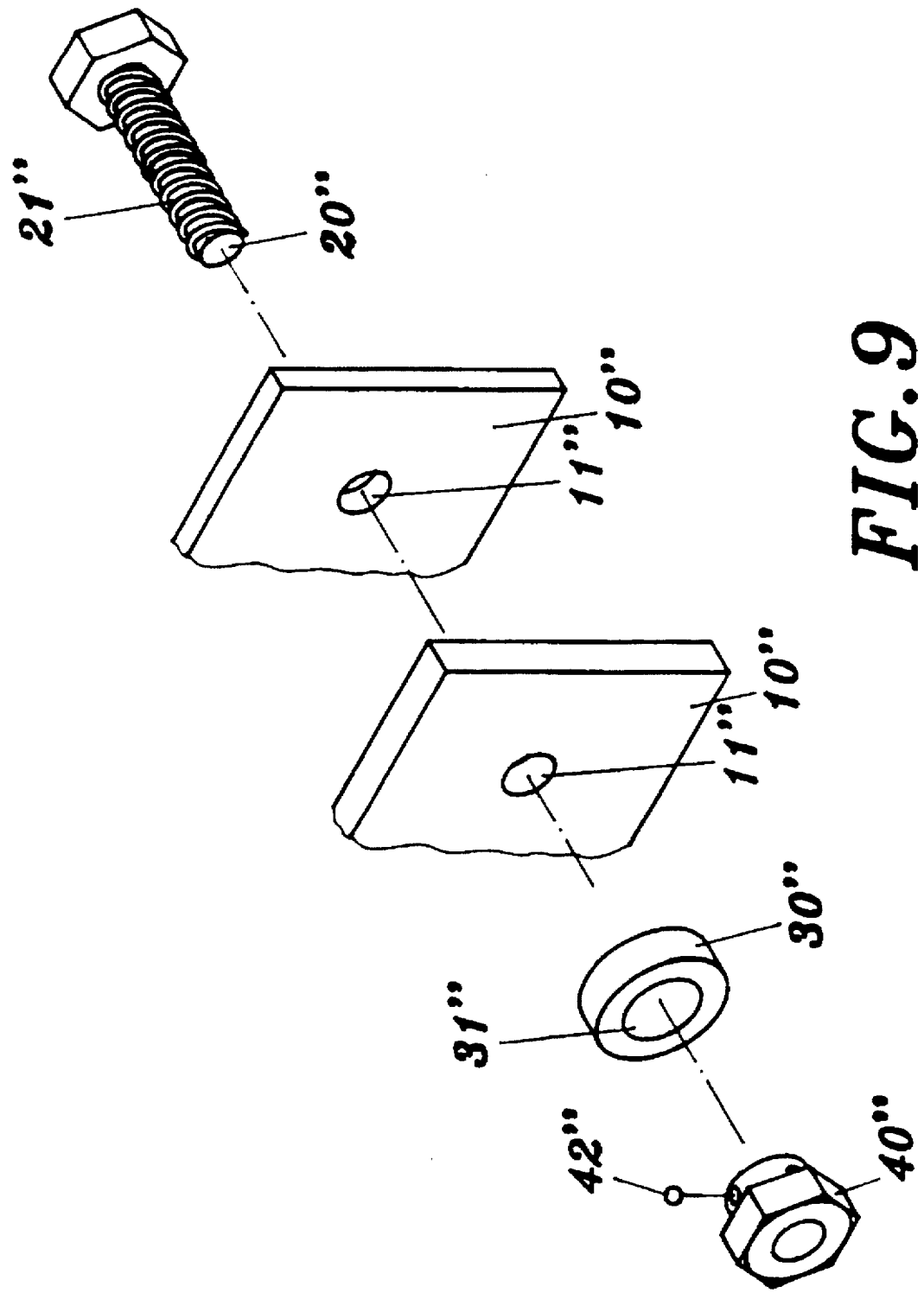
FIG. 9 is an exploded view of another alternate form of the present invention.
Figure 10:
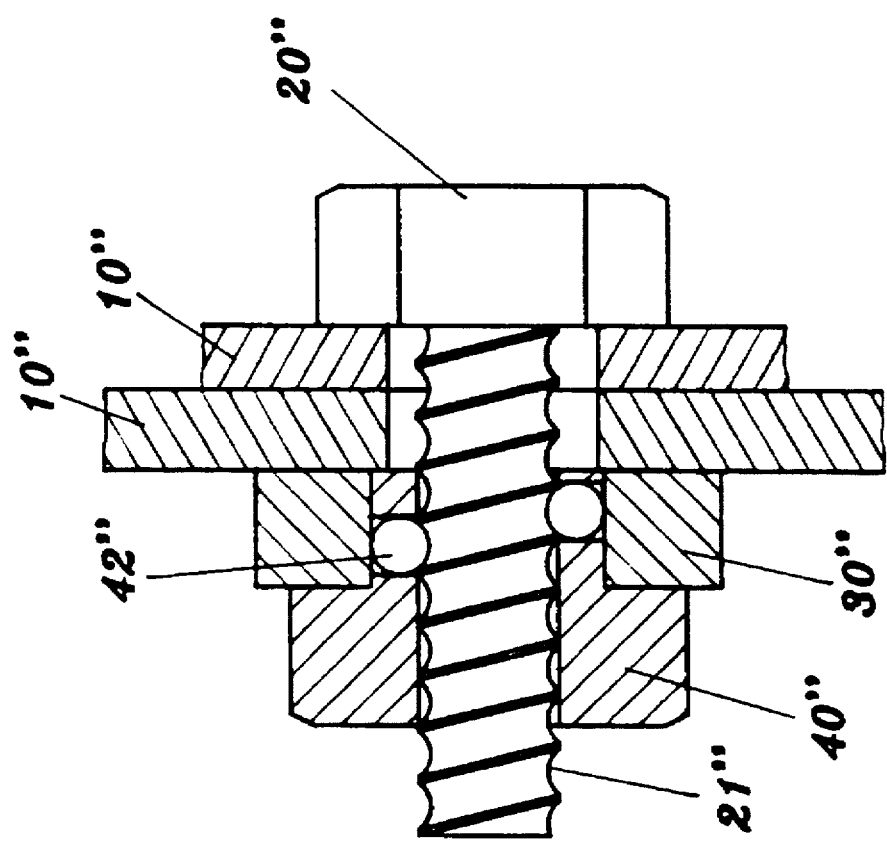
FIG. 10 is a sectional assembly view of the alternate form of FIG. 9.

FIGS. 9 and 10 show another alternate form of the present invention, in which a screw 20" is inserted through holes 11" of one panel 10", a socket 30" is mounted around the screw 20" and stopped at the other panel 10" at an outer side, and a ball thrust bearing 40" is sleeved onto the screw 20" and inserted into the socket 30" permitting steel balls 42" thereof to be formed into engagement with a spiral groove 21" of the screw 20".

It is to be understood that the drawings are designed for purposes of illustration only, and are not intended as a definition of the limits and scope of the invention disclosed.

What the I claim is:

1. A form panel quick fastener comprising a clamping plate, a screw rod, and a ball thrust bearing, said clamping plate having a first hole, said screw rod having an end with a spiral groove, and said ball thrust bearing including a tubular flange with movable steel balls, wherein said form panel quick fastener is adapted to hold a form panel in place by said end of said screw rod passing through said first hole of said clamping plate, and said ball thrust bearing is axially received on said screw rod by said movable steel balls engaging said spiral groove for fixing said ball thrust bearing in place relative to said screw rod.

wherein said clamping plate includes an elongated channel base with an inside and a middle, and a barrel integrally formed with said elongated channel base at said inside and said middle, and said barrel extending perpendicularly from said elongated channel base and including a second hole; wherein said tubular flange of said ball thrust bearing is received in said second hole of said barrel and forces said steel balls into engagement with said spiral groove of said screw rod.

2. The form panel quick fastener of claim 1, wherein said form panel quick fastener is adapted for use with constructional and mechanical quick releasable fastening structures.

3. A form panel quick fastener comprising a clamping plate, a screw rod, and a ball thrust bearing, said clamping plate having a first hole, said screw rod having an end with a spiral groove, and said ball thrust bearing including a tubular flange with movable steel balls, wherein said form panel quick fastener is adapted to hold a form panel in place by said end of said screw rod passing through said first hole of said clamping plate, and said ball thrust bearing is axially received on said screw rod by said movable steel balls engaging said spiral groove for fixing said ball thrust bearing in place relative to said screw rod.

wherein said ball thrust bearing includes a hexagon head having a center hole, said tubular flange extending in an axial direction from one side of said hexagon head and around said center hole, a plurality of radial holes arranged about said tubular flange at different distances from said one side, and said movable steel balls moving within said radial holes so that when said ball trust bearing is rotated onto said screw rod, said tubular flange is forced to move forward along said screw rod and into said hole of said clamping plate to fix the screw rod in place.

4. A form panel quick fastener comprising a clamping plate, a screw rod, and a ball thrust bearing, said clamping plate having a first hole, said screw rod having an end with a spiral groove, and said ball thrust bearing including a tubular flange with movable steel balls, wherein said form panel quick fastener is adapted to hold a form panel in place by said end of said screw rod passing through said first hole of said clamping plate, and said ball thrust bearing is axially received on said screw rod by said movable steel balls engaging said spiral groove for fixing said ball thrust bearing in place relative to said screw rod.

wherein said clamping plate has a center, a middle and a convex portion extending in a longitudinal direction form said middle, and a center hole is provided at said center of said convex portion; said spiral groove of said screw rod extends about a periphery and along an entire length of said screw rod; a locating socket is mounted around said screw rod; said locating socket including a center hole with a peripheral wall, and two locating flanges perpendicularly and bilaterally extending from a bottom side thereof and respectively abutting at opposite sides of said convex portion of said clamping plate; said ball thrust bearing includes a hexagon head; said tubular flange extending in an axial direction from one side of said hexagon head, and including radial holes receiving said steel balls; wherein said tubular flange is inserted into said center hole of said locating socket, and said steel balls are forced by said peripheral wall of said center hole of said locating socket into engagement with said spiral groove of said screw rod.

* * * * *